United States Patent [19]

Prieur

[11] 3,797,033

[45] Mar. 12, 1974

[54] SAFETY DEVICE FOR A READ-WRITE APPARATUS OF MAGNETIC DISKS

[75] Inventor: Lucien Robert Prieur, Ecouen, France

[73] Assignee: Societe Industrielle Honeywell Bull, Paris, France

[22] Filed: July 14, 1972

[21] Appl. No.: 271,885

[30] Foreign Application Priority Data

Apr. 8, 1972 France ............................ 71.28579

[52] U.S. Cl. ............................................ 360/98
[51] Int. Cl. ............................................ G11b 1/02
[58] Field of Search ....... 179/100.2 Z; 340/174.1 C; 346/74 MD, 137; 274/41.4, 4

[56] References Cited

UNITED STATES PATENTS

| | | | |
|---|---|---|---|
| 3,487,390 | 12/1969 | Klinger et al. | 340/174.1 C |
| 3,643,240 | 2/1972 | Raiser | 340/174.1 C |
| 3,593,327 | 1/1971 | Shill | 340/174.1 C |
| 3,529,301 | 9/1970 | Hiruta | 340/174.1 C |

*Primary Examiner*—Vincent P. Canney
*Attorney, Agent, or Firm*—Ronald J. Reiling

[57] ABSTRACT

A safety device for a read and write apparatus with at least one removable magnetic disk enclosed in a cartridge with openings for retractable elements moving from the operating position in the cartridge to the rest position outside the cartridge; the above mentioned cartridge is held in place on the apparatus by means of removable attachments located on its outer surface. The device is provided with means for controlling the movement of the above mentioned elements and cooperating with the above mentioned attachments to prevent the possibility of removing the cartridge from the apparatus while said elements are even partially located in the cartridge.

12 Claims, 5 Drawing Figures

SAFETY DEVICE FOR A READ-WRITE APPARATUS OF MAGNETIC DISKS

BACKGROUND OF THE INVENTION

The object of the present invention is to provide a safety device for a read-write apparatus used with magnetic disks, especially a disk storage unit.

This type of apparatus is known to include generally at least one removable magnetic disk enclosed in a cartridge which is equipped with openings for enabling exterior elements which it is necessary to retract for smooth operation of the apparatus, such as magnetic read and write heads and cleaning brushes for the disk, to pass therethrough.

Thus, so as to prevent damage to these elements and eventually to the disk and its cartridge, it is absolutely necessary to make sure that these elements are in a retracted position before the cartridge is removed from the apparatus. A mishandling may all the more easily occur as the cartridge is generally inserted in a seat built into the cover of the apparatus which shields these elements. The elements can, therefore, not be seen and it is possible for one to believe that they are in a retracted position, while actually they are still in the interior of the cartridge. Such a mishandling occurs much more rarely during the insertion of the cartridge, for if the elements are not in a retracted position they appear outside the seat which does not yet contain the cartridge.

The cartridge is also known to be held in place in its seat by means of removable holding brackets, placed at the periphery of said cartridge, which usually pivot.

The present invention is designed to avoid the aforementioned disadvantage.

SUMMARY OF THE INVENTION

According to the invention, the safety device for a read-write apparatus comprises at least one removable magnetic disk, enclosed in a cartridge which is equipped with openings to enable the passing of retractable elements that move between an operating position within the cartridge and a rest position outside of the latter. Said cartridge is held in place in the apparatus by means of removable holding brackets placed on its periphery and is distinguished in that it includes means for control relative to the movement of said elements and is interacting with said holding brackets so as to prevent the possible removal of the cartridge from the apparatus while the elements are positioned at least partially in its interior.

In a first embodiment, said means for control lock holding brackets in their position, to which end they hold the cartridge in place on the apparatus while the elements are arranged at least partially inside the cartridge.

In a second type of execution said means operate in a way that causes the elements to come forth from the cartridge when the holding brackets are manipulated so as to remove the cartridge from the apparatus.

Advantageously, each retractable element carries its own means of control and preferably each element is connected with a holding bracket. Thus, in the case of an apparatus in which the outside elements consist on the one hand of read-write heads of the removable disk, and on the other hand of cleaning brushes for the latter, and in which the cartridge of that disk is held in place by two holding brackets in diametrically opposite positions, one of these is connected with said heads and the other with said brushes.

The mechanical connection between the element and the holding brackets preferably consists of a covered cable.

In a simple version of embodiment one of the cable ends is integrally connected with a lug that locks at least one holding bracket in the operating position of one of the elements, while its other end is solidly attached to a lever activated by the element to unlock the holding bracket when the latter retracts toward its position outside the cartridge.

In a different mode of design, the two cable ends are integral with pins which are capable of interacting with a cam carried by the holding brackets and with a cam carried by the element, respectively affiliated in such a way that when the latter is in the operating position the bracket is locked, while when this element retracts toward its position outside the carriage it unlocks that bracket whose opening locks the element in the rest position.

In another design variant, one of the cable ends is directly connected with a holding bracket, while its other end is integral with a lever activated through the opening of said bracket controlling the return of the elements to the rest position. This lever may act directly upon said element to push it back into the rest position. The element is preferably displaced by driving forces toward its operating position countering the action of elastic forces forcing it towards its rest position and said lever acts as a releasing device permitting the release of the element from said driving forces and its submission to the action of said elastic forces.

BRIEF DESCRIPTION OF THE DRAWINGS

The attached drawings are intended to clarify the manner in which the invention operates.

Identical reference characters in these figures denote identical elements.

DESCRIPTION OF THE PREFERRED EMBODIMENTS

Figures 1, 2:
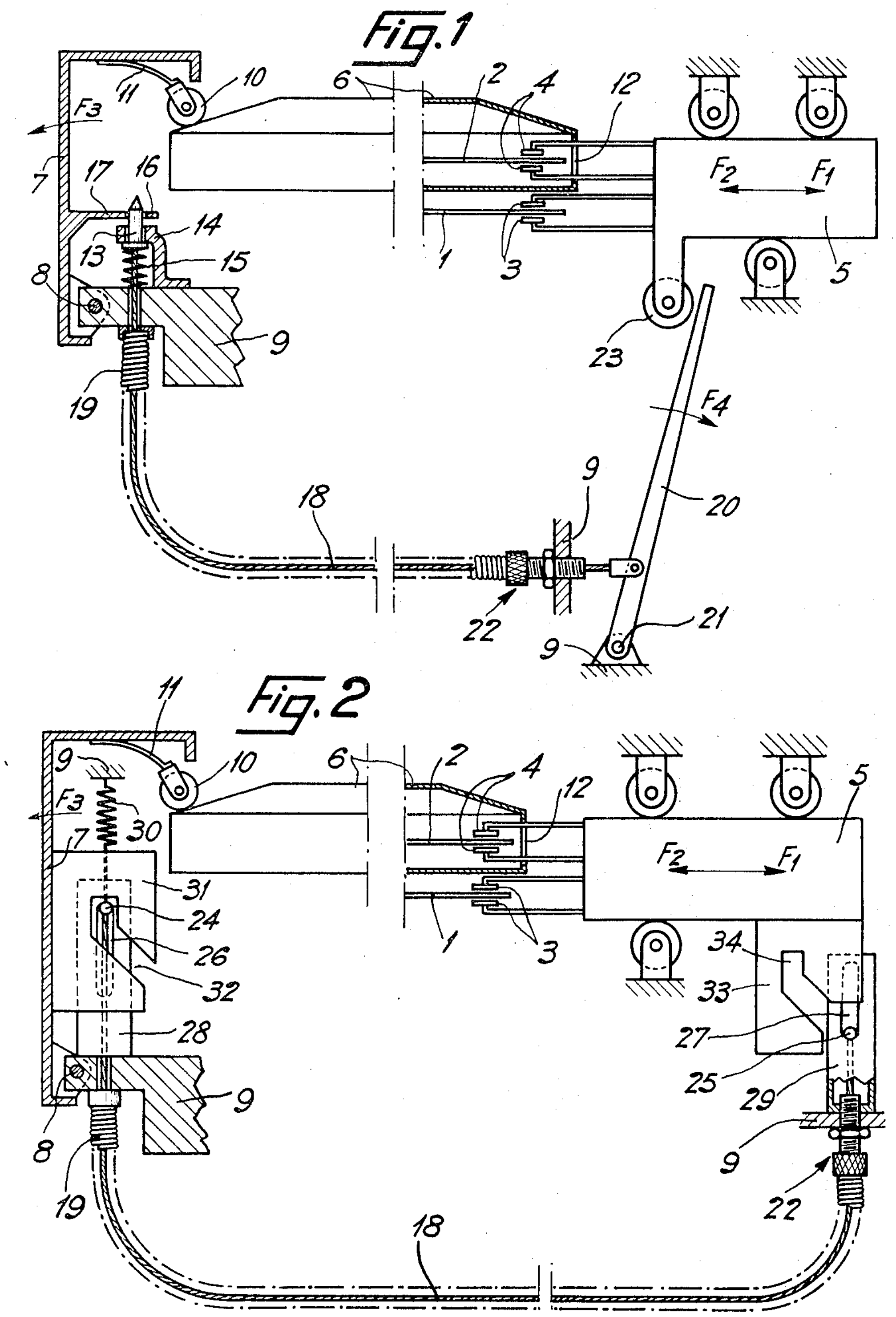
FIGS. 1 to 3 show schematically three separate embodiments of the invention, especially designed to protect the magnetic read heads of the apparatus.

The apparatus shown partially in FIG. 1 comprises a solidly attached magnetic disk 1 and a removable magnetic disk 2 which may be read or recorded on by means of the magnetic heads 3 and 4, repectively carried by a sliding carriage 5. The removable magnetic disk 2 is enclosed in a circular cartridge 6 generally maintained in the apparatus by means of holding brackets, placed in a diametrically opposite position of which only one, bearing the reference number 7, is shown. This holding bracket 7 is capable of revolving around a pivotal axle 8 connected with the frame 9 of said apparatus, and pushes the cartridge 6 by means of a roller 10, made integral with said bracket by means of an elastic blade 11. As far as the magnetic heads 4 are concerned the cartridge 6 is provided with an opening 12 enabling the latter to pass therethrough. When the cartridge 5 moves in the direction of the arrow F1, toward the rest position of the heads 4, the latter come forth through the opening 12 and move away from the cartridge 6. In contrary manner, when the carriage 5 moves in the direction of arrow F2, toward the operating position of the heads 4, the heads move close to the cartridge 6 and enter into the opening 12 to take their position on the disk 2.

In accordance with the invention, the device of FIG. 1 includes a lug 13, sliding in a bearing block 14 which is an integral part of the frame 9 and pushed elastically by a spring 15 to the inside of an opening 16 made in a plate 17, integral with bracket 7. As long as the lug 13 is engaged in the opening 16 the holding bracket 7 cannot rotate in the direction of the arrow F3 to release the cartridge 6.

The lug 13 is, furthermore, solidly connected with one end of the cable 18 surrounded by a cover 19 and capable of sliding in it. The other end of the cable 18 is solidly attached to an rotable lever 20 capable of pivoting at one of its ends around an axle 21 connected with the frame 9. A tensioning device 22 makes it possible to control the tension of the cable 18.

The end of the lever 20 opposite to the axle 21 is capable of interacting with a roller 23 attached to the carriage 5 to cause the lever 20 to rotate in the direction of the arrow F4 when the carriage moves in the direction F1. When the lever 20 swings in the direction F4 the cable 18 pulls the lug 13 to counteract the action of spring 15 and this lug 13 leaves the opening 16, releasing the holding bracket 7.

Thus, as long as the heads 4 are in the operating position, the bracket 7 is locked by the lug 13 and the cartridge 6 may not be lifted off its seat in the apparatus. In contrary manner, when the carriage 5 has brought the heads 4 to the rest position, the lever 20 has rotated effecting the unlocking of the bracket 7 by the stud 13. The cartridge 6 may then be removed from its seat.

FIG. 2 illustrates a variation of the embodiment of the device of FIG. 1. In this variation the two ends of the cable 18 are solidly attached to the transverse rods 24 and 25, respectively capable of sliding in the oblong openings 26 and 27, respectively with which the tubes 28 and 29 covering said ends of the cable 18 are equipped. Both tubes 28 and 29 each include an oblong opening 26 or 27 through which pass the ends of the corresponding rod 24 or 25. When the bracket 7 is in the locked position spring 30 pulls the rod 24, positioned laterally to the bracket 7, in the direction of the upper part of the openings 26, and pulls the other rod 25 in the direction of the lower part of the openings 27.

The bracket 7 comprises 2 parallel plates 31 on either side of the tube 28 having bent cut-outs 32 in incline form. The ends of the rod 24 extending from the tube 28 are engaged in the cut-outs 32. When the bracket 7 is in a locked position the interaction of the rod 24 and the cut-outs 32 prevents this bracket 7 from swinging in the direction of the arrow F3, around the axle 8.

The carriage 5 is also equipped with two parallel plates 33 positioned on either side of the tube 29, having bent cut-outs 34 in the form of inclines. The ends of the rod 25, protruding from the tube 29, are designed to engage into the cut-outs 34 when the carriage 5 moves in the direction of arrow F1. When this occurs the interaction of the rod 25 and the inclines 34 causes this rod 25 to rise and the rod 24 to drop by countering the action of the spring 30. When the two rods 24 and 25 reach the respective bends of the inclines 32 and 34 respectively, it becomes possible to have the bracket 7 rotate around the axle 8 in the direction of the arrow F3. During the rotation of the bracket 7 the inclines 32 force the rod 24 to drop still further and the rod 25 to pass the bend of the inclines 34 which makes possible the locking of the carriage 5 in the rest position.

Thus, the device of FIG. 2 provides not only the locking of the cartridge 6 while the heads 4 are in operating position, but also the locking of the carriage 5 in the rest position as long as the bracket 7 is not in the position in which it holds the cartridge 6 in place.

The devices of FIGS. 1 and 2 thereby make it possible to prevent damage of the heads 4 by preventing the removal of the cartridge 6 when the heads are still in the operating position. Yet these devices have a disadvantage. When during a break-down for example, the carriage 5 is unable to return to its rest position, the bracket 7 remains locked and the cartridge 6 cannot be removed to be used, for instance on another apparatus, as long as this break-down has not been repaired.

Figure 3:
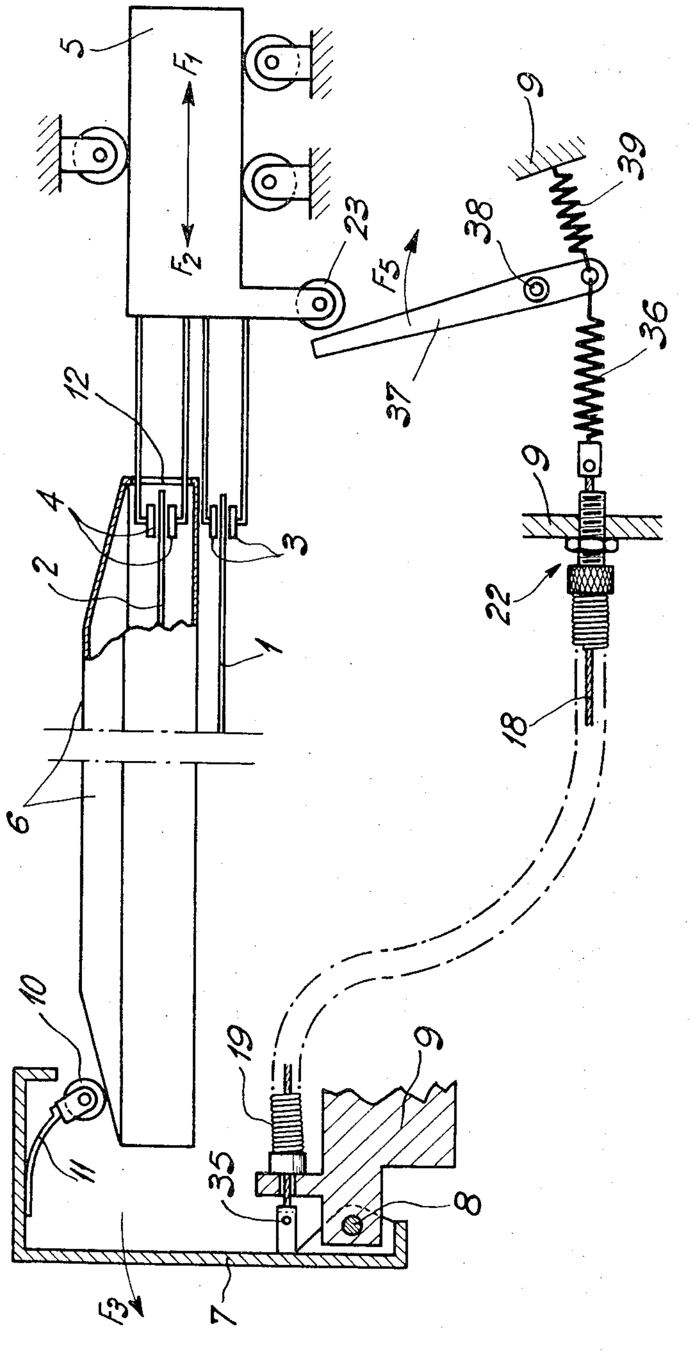

The device of FIG. 3 corrects this draw-back.

In the device of FIG. 3 one of the ends of the cable 18 is solidly attached at 35 to the bracket 7, while its other end is connected by means of a draw-spring 36 with one end of the lever 37, pivoting around an axle 38. Another draw-spring 39, less strong than the spring 36 and acting against the latter, is positioned between the frame 9 and said end of the lever 37. The other end of the lever 37 is capable of interacting with the roller 23, connected to the carriage 5, to push back the latter in the direction of the arrow F1 when the bracket 7 swings in the direction of the arrow F3. In fact, in this case the cable 18 is pulled toward the left of FIG. 3 and the lever 37 swings in the direction of arrow F5.

Thus, because of the springs 36 and 39 the equilibrium position of the bracket 7 is the one for which it maintains the cartridge 6. In this position, at any rate, the bracket is not locked. It may be made to rotate, though, but then the carriage is pushed back automatically to the rest position and the cartridge 6 may be removed without there being any risk of damaging the heads 4. The spring 39 serves to return the lever 37 to its position, as shown in FIG. 3 after rotation in the direction of arrow F5.

Figure 4:
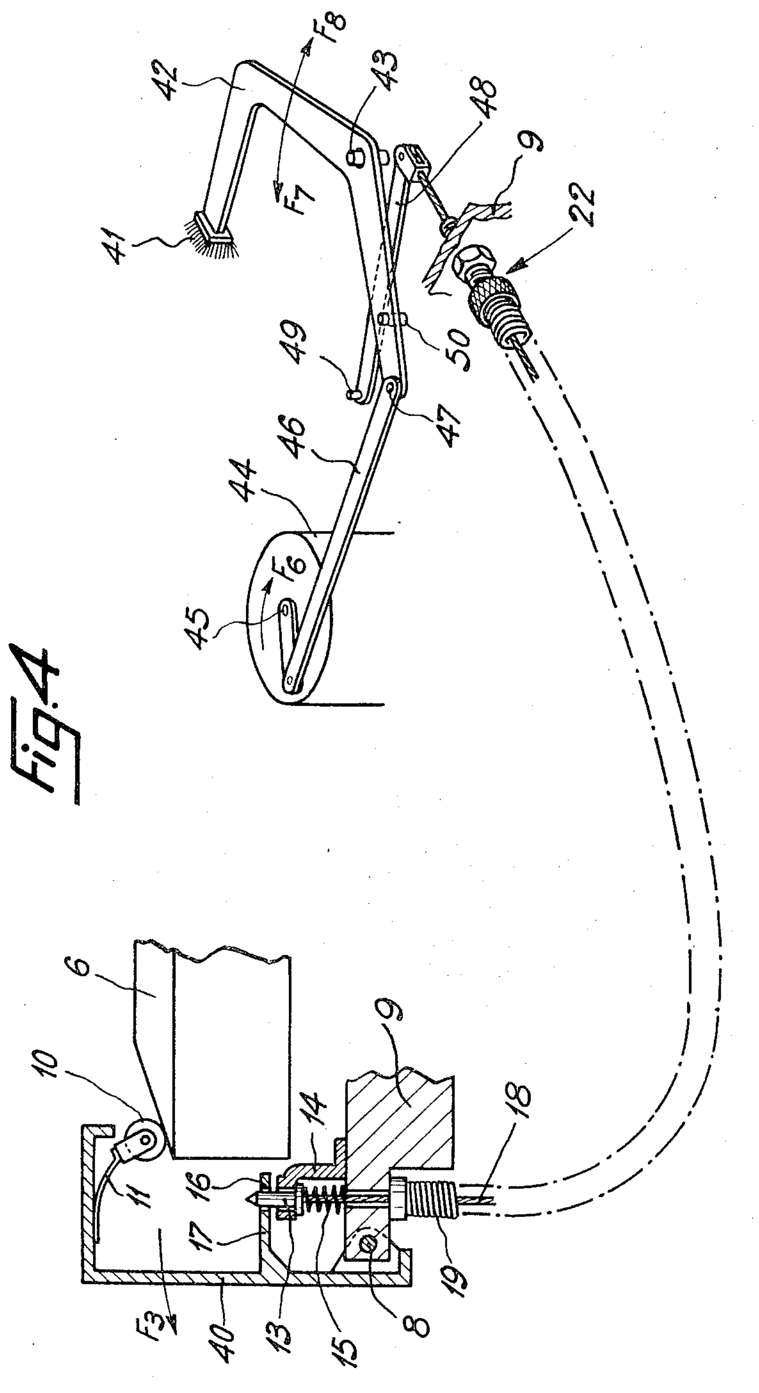
FIGS. 4 and 5 show schematically two types of embodiments of the invention, especially designed to protect the cleaning brushes of the removable disk.
Figure 5:
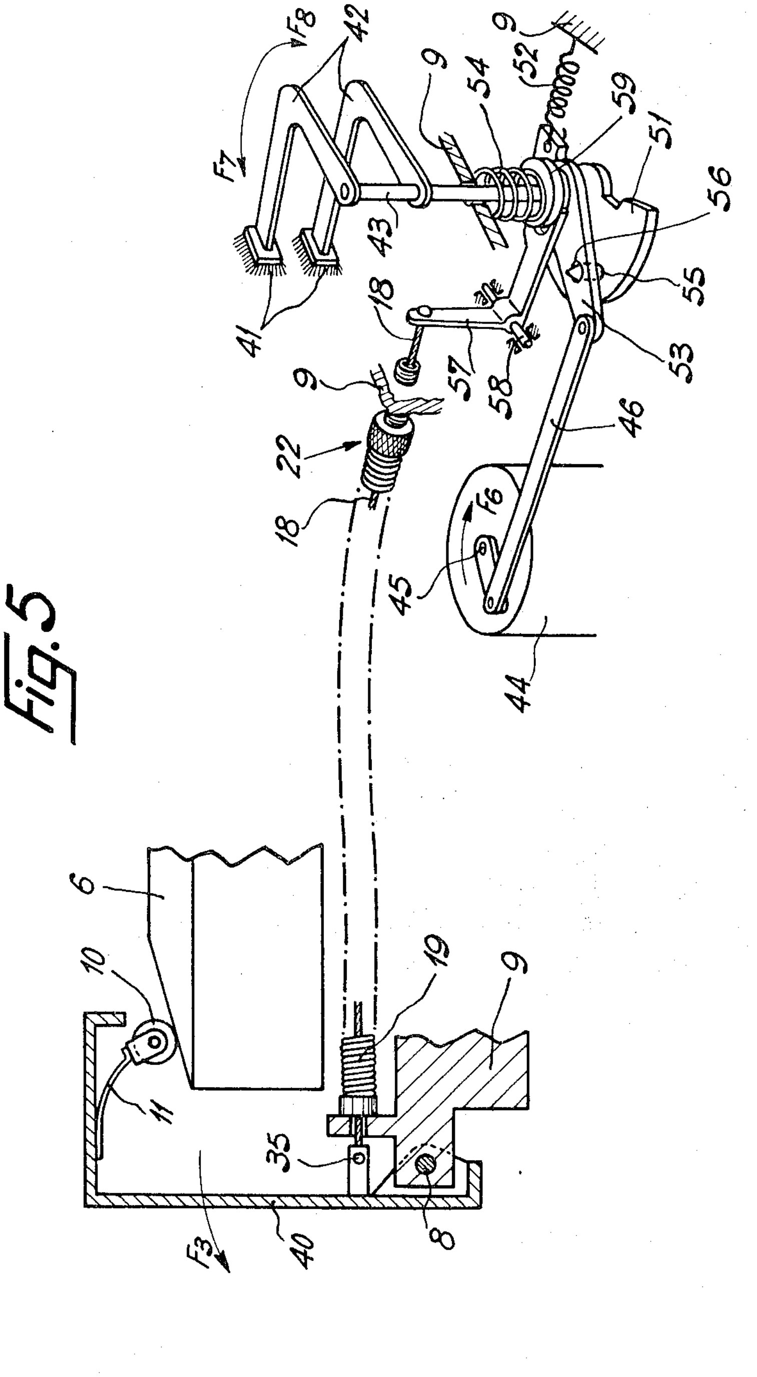

FIGS. 4 and 5 demonstrate use of the invention when applied to the brush system capable of entering the interior of the cartridge 6 through an opening (not shown) similar to the opening 12 provided for the magnetic heads 4.

In the general case in which the cartridge 6 is held in place on the write-read unit by two diametrically opposed brackets, one of these brackets (having the reference numeral 7 in FIGS. 1, 2 and 3) associated with the safety device for the magnetic heads and the other (bearing the reference numeral 40 in FIGS. 4 and 5) is connected with the safety device for the brushes.

In FIG. 4 the cleaning brushes 41 of the disk 2 are installed at the end of a bent lever 42 capable of pivoting around an axle 43 revolving in the frame 9 and driven by an electric motor 44 whose shaft 45 is joined with the lever 42 by a crank 46 linked at 47 with the latter. When the shaft 45 revolves in the direction of the arrow F6 the brushes 41 move alternatingly in the direction of the arrow F7 (in the direction of their operating position by crossing the cartridge wall) and in the direction of the arrow F8 (in the direction of their rest position outside the cartridge).

On the holding bracket a device 13, 14, 15, 16, 17, 18, 19, and 22 similar to that of FIG. 1 is mounted. The end of cable 48 opposite the lug 13 is linked to the end of a lever 48 whose opposite end is linked to the frame 9 by means of a pivot 49. The arm 42 carries a lug 50 resting laterally on the lever 48. When the brushes are in the operating position in the interior of the cartridge 6 the lug locks the bracket 40 which is unable to rotate in the direction of the arrow F3. In contrary manner, when the brushes 41 revolve in the direction of the arrow F8 by leaving the cartridge, the lug 50 causes the lever 48 to pivot in the direction of the arrow F8 and the lug 13 comes out of the opening 16. The bracket 40 may then be made to rotate.

Thus, the device of FIG. 4 only allows the removal of the cartridge 6 when the brushes 41 are outside the latter. Hence, the arrangement makes it possible to avoid the above mentioned, but involves the disadvantage mentioned regarding the devices of FIGS. 1 and 2.

The device of the FIG. 5 provides a remedy for this disadvantage. In this device, the arrangement 35, 18, 19, 22, described with respect to FIG. 3, is found again as applied to the bracket 40. The brushes 41 are mounted on the ends of the bent levers 42 in fixed attachment to the axle 43 rotating relative to the frame 9, and in solid connection with a segment 51 on which a spring 52 acts, said spring being connected by one of its ends to the frame 9, in the direction of the arrow F8. A lever 53 is slidingly mounted on the shaft 43 the rotation of the lever being set in motion by the shaft 45 of an electric motor 44 by means of the crank 46.

The lever 53 is pushed in the direction of the segment 51 by a spring 54 and is made integral with said segment when rotating by a lug 55 carried by the latter and passing through a hole 56 in said lever. The lever 53 may be moved along the shaft 43, countering the action of the spring 54 by an angle member 57, revolving around an axle 58 that revolves relative to the frame 9 and positioned close to its bend. One of the branches of the angle member 57 is connected with the cable 18 and the other in fork shape rests under a shoulder 59, integral with the lever 53.

Hence, due to the spring 54 the bracket 40 is held in its position wherein it holds the cartridge 6. Yet it is not locked. When the bracket 40 is made to rotate in the direction of the arrow F3 the cable 18 pulls the angle member 57, which by pivoting lifts the lever 53. The lug 55 then leaves the hole 56 and the segment 51 is pushed in the direction of F8 by the spring 52. The brushes thus automatically come out of the cartridge 6 due to the rotation of the bracket 40. The locking of the segment 51 and of the lever 53 will automatically be restored by reentering of the lug 55 in the hole 56.

What is claimed is:

1. A safety device for a read-write apparatus, said read-write apparatus comprising a cartridge enclosing at least one magnetic disk, said cartridge having at least one access opening therein, at least one element cooperable with said magnetic disk within said cartridge, mounting means mounting said element for movement between an operating position passing through said access opening and within said cartridge and of rest position outside of the cartridge, pivotably mounted holding bracket means located about the outer surface of the cartridge for holding the cartridge in an operative position on the apparatus; and said safety device including latching means for interacting with said holding bracket means for preventing removal of the cartridge from said apparatus while said element is located at least partly within the interior of said cartridge, and means cooperatively inter-connecting said latching means and said element for related movements.

2. A device according to claim 1, characterized in that said latching means lock said holding bracket means in their position for which purpose they hold the cartridge in place on the apparatus as long as said elements are positioned at least partly inside the cartridge.

3. A device according to claim 1, characterized in that said connection between said element and said latching acts to cause said element to leave the cartridge when said holding bracket means are moved to positions permitting removal of the cartridge from the apparatus.

4. A device according to claim 1 characterized by there being a plurality of said retractable elements and each retractable element controlling said latch means by its own means of control.

5. A device according to claim 1, characterized by there being a plurality of said retractable elements and each element being operatively associated with a holding bracket means.

6. A device according to claim 5 for an apparatus in which said movable elements include read-write heads for the disk and a cleaning brush for the disk, the cartridge is held in place by two holding bracket means in diametric opposed positions, and said latching means of one of the holding bracket means is associated with said heads while the other of said holding bracket means is connected with said brush.

7. A device according to claim 1, characterized in that the mechanical connection between said element and said holding bracket means includes an enclosed cable.

8. A device according to claim 7, characterized in that the cable has one end integral with a bolt locking in operating position at least one holding bracket means when said element is in operating position, while the cable other end is solidly attached to a lever activated by said element for unlocking said holding bracket means when the element retracts to its position outside the cartridge.

9. A device according to claim 7, characterized in that the cable has two ends integral with pins capable of cooperating with a cam carried by said holding bracket means and a cam carried by said element respectively, and means connecting said pins in such a way that when the element is in operating position said bracket means is locked in its cartridge holding position and when the element retracts to its position outside the cartridge said bracket means are opened and said bracket means opening locking said element in the rest position thereof.

10. A device according to claim 7, characterized in that the cable has one end directly connected with said holding bracket means, said cable other end is connected with a lever for setting said lever in motion in response to opening of said bracket means and controlling the return to the rest position of said element.

11. A device according to claim 10, characterized by means coupling said lever to said element with lever acting directly on said element to push said element back into the rest position.

12. A device according to claim 10, characterized in that there are driving means connected to said element for driving said element to its operating position, elastic means acting on said element countering the action of driving means and forcing said element toward the rest position, and unlocking means for effecting the release of said element from said driving means and the action of said elastic means, said lever being coupled to said unlocking means for effecting actuation thereof.

* * * * *